(12) United States Patent
Wang et al.

(10) Patent No.: US 10,021,663 B2
(45) Date of Patent: Jul. 10, 2018

(54) METHOD AND DEVICE FOR REALIZING DATA TRANSMISSION

(71) Applicant: ZTE CORPORATION, Shenzhen, Guangdong Province (CN)

(72) Inventors: Xin Wang, Shenzhen (CN); Feng He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 30 days.

(21) Appl. No.: 15/114,078

(22) PCT Filed: May 28, 2014

(86) PCT No.: PCT/CN2014/078590
§ 371 (c)(1),
(2) Date: Jul. 26, 2016

(87) PCT Pub. No.: WO2015/109709
PCT Pub. Date: Jul. 30, 2015

(65) Prior Publication Data
US 2016/0374036 A1    Dec. 22, 2016

(30) Foreign Application Priority Data

Jan. 27, 2014  (CN) .......................... 2014 1 0040570

(51) Int. Cl.
*H04W 56/00*    (2009.01)
*H04W 28/08*    (2009.01)
(Continued)

(52) U.S. Cl.
CPC ............. *H04W 56/005* (2013.01); *H04L 1/18* (2013.01); *H04L 1/1841* (2013.01);
(Continued)

(58) Field of Classification Search
None
See application file for complete search history.

(56) References Cited

U.S. PATENT DOCUMENTS

2012/0294281 A1    11/2012  Park
2015/0043435 A1*    2/2015  Blankenship ......... H04L 69/322
                                                                        370/329
(Continued)

FOREIGN PATENT DOCUMENTS

CN            201256395 Y      6/2009
CN            101809948 A      8/2010
(Continued)

*Primary Examiner* — Eunsook Choi
(74) *Attorney, Agent, or Firm* — Ling Wu; Stephen Yang; Ling and Yang Intellectual Property

(57) ABSTRACT

A method and device for realizing data transmission, including: when a starting condition of a timer of a packet data convergence protocol (PDCP) of a data receiving side is satisfied, starting the timer of the PDCP of the data receiving side, and receiving and reordering data within a duration of the timer; and when a stopping condition of the timer of the PDCP of the data receiving side is satisfied, stopping the timer, and delivering to an upper layer the reordered data that has been processed; wherein the duration of the timer is related to a radio link control (RLC) mode of an offloading bearer. In embodiments of the present document, by setting the starting condition of the timer of the PDCP at the data receiving side, data packets are received and reordered within the duration of the timer when the data packets are received, and the timer is stopped while the data packets are continuously delivered when the stopping condition of the timer is satisfied, which realizes efficient ordered transmission of the data packets of the PDCP.

16 Claims, 4 Drawing Sheets

(51) Int. Cl.
*H04L 1/18* (2006.01)
*H04W 76/00* (2018.01)
*H04W 84/04* (2009.01)

(52) U.S. Cl.
CPC ......... *H04L 1/1848* (2013.01); *H04W 28/085* (2013.01); *H04W 76/00* (2013.01); *H04L 1/1867* (2013.01); *H04W 84/042* (2013.01)

(56) References Cited

U.S. PATENT DOCUMENTS

2016/0014647 A1* 1/2016 Yi ..................... H04W 36/0072
 370/331
2016/0277154 A1* 9/2016 Quan ..................... H04L 47/34

FOREIGN PATENT DOCUMENTS

| WO | 2009018318 A2 | 2/2009 |
| WO | 2012064772 A2 | 5/2012 |

* cited by examiner

US 10,021,663 B2

METHOD AND DEVICE FOR REALIZING DATA TRANSMISSION

TECHNICAL FIELD

The present document relates to the field of mobile communications, and more particularly, to a method and a device for realizing data transmission.

BACKGROUND OF THE RELATED ART

With the constant evaluation of wireless communications technologies and standards, the mobile packet services are developed greatly, and the data throughput capability of a single terminal has been promoted continually. With a Long Term Evolution (LTE) system as an example, the data transmission with a downlink maximum rate of 100 Mbps can be supported within a 20M bandwidth, and in the subsequent enhanced LTE (LTE-A) systems, the data transmission rate will be promoted further, and it can even reach 1 Gbps.

The inflatable growth of data service volume of the terminal makes deployment policy and services capability face huge pressure and challenge. Operators, on the one hand, need to enhance prior communications technologies and network deployment, and on the other hand, wish to accelerate the spread and the network expansion of new technologies, so as to achieve the purpose of promoting network performance rapidly. Systems for mobile communications have evolved such that it gets more difficult to provide affordable, flexible, and high-capacity services only by enhancing macro networks, therefore, a network policy of deploying a low power node (LPN) to provide a small cell coverage has become an extremely attractive solution.

SUMMARY

In order to solve the above technical problem, the present document provides a method and device for realizing data transmission, which can perform offloading transmission on data packets of PDCP, solves the problem of disordering of the data packets caused by delay of two RLCs, and realizes efficient reordering of the data packets.

To achieve the object of the application, the present document provides a method for realizing data transmission, including:

when a starting condition of a timer of a packet data convergence protocol (PDCP) of a data receiving side is satisfied, starting the timer of the PDCP of the data receiving side, and receiving and reordering data within a duration of the timer; and when a stopping condition of the timer of the PDCP of the data receiving side is satisfied, stopping the timer, and delivering to an upper layer the reordered data that has been processed; wherein the duration of the timer is related to a radio link control (RLC) mode of an offloading bearer.

Preferably, the starting condition of the timer is that:

a serial number (SN) of a PDCP protocol data unit (PDU) transmitted by any one of RLCs and received by the PDCP of the data receiving side is not continuous with an SN of a last PDU transmitted to an upper layer; or two RLCs corresponding to the PDCP are changed to one RLC.

Preferably, the stopping condition of the timer is that:

a duration value of the timer is reached; or within the duration of the timer, the PDCP of the data receiving side finishes receiving PDCP PDUs that need to be reordered and of which SNs are before a PDU SN that triggers starting the timer.

Preferably, the duration of the timer being related to the RLC mode of the offloading bearer includes:

when the offloading bearer is an offloading bearer mapped to an RLC acknowledged mode (AM), a duration value of the timer being a sum of an average delay of interfaces of a master eNB and a secondary eNB, a maximum allowed delay of an RLC automatic repeat request (ARQ), a maximum delay of a media access control layer (MAC) ARQ, a scheduling delay, and a delay related to interfaces of the master eNB and the secondary eNB; or when the offloading bearer is an offloading bearer mapped to an RLC unacknowledged mode (UM), a duration value of the timer being a sum of an average delay of interfaces of the master eNB and the secondary eNB, a maximum delay of a MAC ARQ, a scheduling delay and a delay related to interfaces of the master eNB and the secondary eNB.

Preferably, the method further includes that: during a period that the timer is started and performs timekeeping, no new timer is started and performs timekeeping.

Preferably, the data receiving side is a master eNB (MeNB) or a user equipment (UE).

Preferably, when the data receiving side is the MeNB, a duration value of the timer is set by the MeNB itself; or when the data receiving side is the UE, a duration value of the timer is set by the MeNB indicating the UE via a control plane message; wherein the control plane message is a radio resource control (RRC) message, a PDCP layer control plane PDU, or a newly added control plane signaling.

Preferably, when the offloading bearer is an offloading bearer mapped to the RLC AM, and after a link of the offloading bearer is released, the method further includes:

the data receiving side sending a PDCP state report to a data transmitting side to request for data retransmission because of not receiving PDCP PDUs that need to be reordered, and the PDCP of the data receiving side restarting the timer to receive data.

Preferably, when the restarted timer is stopped, the method further includes:

if the data receiving side receives the PDCP PDUs that need to be reordered, transmitting to an upper layer data packets that have been reordered and processed; and if the data receiving side does not receive all the PDCP PDUs that need to be reordered, the PDCP of data receiving side reordering and then delivering to an upper layer the received PDCP PDUs of which SNs are less than the SN that triggers starting the timer.

On another hand, the application further provides a device for realizing data transmission, including: a trigger-on unit and a trigger-off unit; wherein:

the trigger-on unit is configured to, when a starting condition of a timer of a packet data convergence protocol (PDCP) of a data receiving side is satisfied, start the timer, and receive and reorder data within a duration of the timer;

the duration of the timer is related to a radio link control (RLC) mode of an offloading bearer.

The trigger-off unit is configured to, when a stopping condition of the timer of the PDCP of the data receiving side is satisfied, stop the timer, and deliver to an upper layer reordered data that has been processed.

Preferably, the trigger-on unit comprises a condition determination module configured to: determine the starting condition of the timer, and start the timer when a serial number (SN) of a PDCP protocol data unit (PDU) transmitted by any one of RLCs and received by the PDCP of the data receiving side is not continuous with an SN of a last PDU transmitted to an upper layer, or when two RLCs corresponding to the PDCP are changed to one RLC.

Preferably, the trigger-off unit includes a stopping determination module configured to: determine the stopping condition of the timer, and stop the timer when a duration value of the timer is reached, or when within the duration of the timer, the PDCP of the data receiving side finishes PDCP PDUs that need to be reordered and of which SNs are before a PDU SN that triggers starting the timer.

Preferably, the device further includes a timekeeping calculation unit configured to calculate the duration of the timer according to that the duration of the timer is related to the radio link control (RLC) mode of the offloading bearer, wherein:

when the offloading bearer is an offloading bearer mapped to an RLC acknowledged mode (AM), a duration value of the timer is a sum of an average delay of interfaces of a master eNB and a secondary eNB, a maximum allowed delay of an RLC automatic repeat request (ARQ), a maximum delay of a media access control layer (MAC) ARQ, a scheduling delay, and a delay related to interfaces of the master eNB and the secondary eNB; or when the offloading bearer is an offloading bearer mapped to an RLC unacknowledged mode (UM), a duration value of the timer is a sum of an average delay of interfaces of a master eNB and a secondary eNB, a maximum delay of a MAC ARQ, a scheduling delay and a delay related to interfaces of the master eNB and the secondary eNB.

Preferably, during a period that the timer is started and performs timekeeping, no new timer is started and performs timekeeping.

Preferably, the data receiving side is a master eNB (MeNB) or a user equipment (UE).

When the data receiving side is the MeNB, a duration value of the timer is set by the MeNB itself; or when the data receiving side is the UE, a duration value of the timer is set by the MeNB indicating the UE via a control plane message.

The control plane message is a radio resource control (RRC) message, a PDCP layer control plane PDU, or a newly added control plane signaling.

Preferably, the device further includes a time-out processing unit configured to: when the offloading bearer is an offloading bearer mapped to the RLC AM, and the data receiving side does not receive PDCP PDU packets that need to be reordered after a link of the offloading bearer is released, according to that the data receiving side sends a PDCP state report to a data transmitting side, request the timer to restart and deliver data.

Preferably, the time-out processing unit further includes a receiving processing module configured to: when the timer is stopped, if the receiving side receives the PDCP PDUs that need to be reordered, transmit to an upper layer the PDCP PDUs that have been reordered and processed; and if the receiving side does not receive all the PDCP PDUs that need to be reordered, reorder and then deliver to an upper layer the received PDCP PDUs of which SNs are less than the SN that triggers starting the timer.

The application provides a technical solution, including: when a starting condition of a timer of a packet data convergence protocol (PDCP) of a data receiving side is satisfied, starting the timer of the PDCP of the data receiving side, and receiving and reordering data within a duration of the timer; and when a stopping condition of the timer of the PDCP of the data receiving side is satisfied, stopping the timer, and delivering to an upper layer the reordered data that has been processed; wherein the duration of the timer is related to a radio link control (RLC) mode of an offloading bearer.

In embodiments of the present document, by setting the starting condition of the timer of the PDCP, data packets are delivered and reordered within the duration of the timer when the data packets are delivered, and the timer is stopped while the data packets are continuously delivered when the stopping condition of the timer is satisfied, which realizes efficient ordered transmission of the data packets of the PDCP.

BRIEF DESCRIPTION OF DRAWINGS

The accompanying drawings illustrated herein which are used to provide further understanding of the present document constitute part of the present application, and exemplary embodiments of the present document and the description thereof used to explain the present document are not intended to inappropriately limit the present document. In the drawings.

PREFERRED EMBODIMENTS

Figure 1:
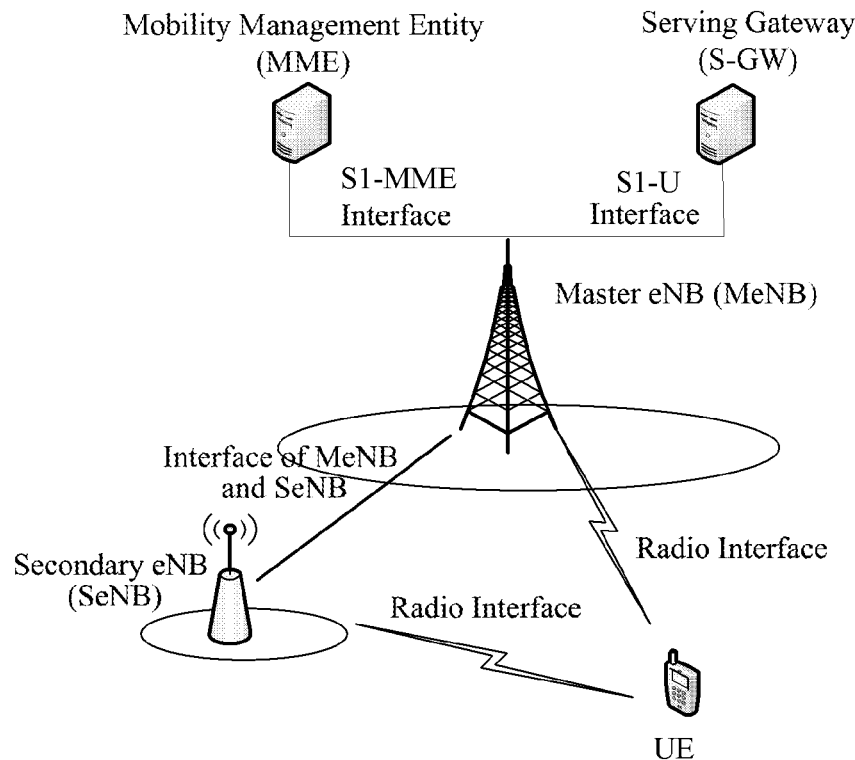
FIG. 1 is a schematic diagram of a network deployment of a system architecture applicable to an embodiment of the present document.

Enhancement of capability and deployment of a small cell has been determined by the 3GPP as one of the most interesting subjects of the future network. At present, the industry largely agrees the following scene: low power nodes are deployed at the border or within the coverage area of a macro base station, the power nodes both at the border and within the coverage area together constitute an access network of an evolved universal terrestrial radio access network (E-UTRAN) system architecture, so as to provide joint data transmission services for a user equipment (UE). Further, such system architecture has been confirmed basically. FIG. 1 is a schematic diagram of a network deployment of a system architecture applicable to an embodiment of the present document. As shown in FIG. 1, in such system architecture, a base station, which establishes an S1-MME interface with a mobility management entity (MME) in a core network (CN) and is regard as a base station of a mobile anchor point by the CN, is named as a master eNB (MeNB); except the MeNB, the node which provides extract radio resource for the UE is named as a secondary eNB (SeNB). A data transmission interface exists between the MeNB and the SeNB, and may deliver a control plane message and user plane data. The MeNB establishes radio interfaces (generally indicating Uu) with both the SeNB and the UE, that is, the UE is in a dual-connectivity (DC) state.

Figure 2:
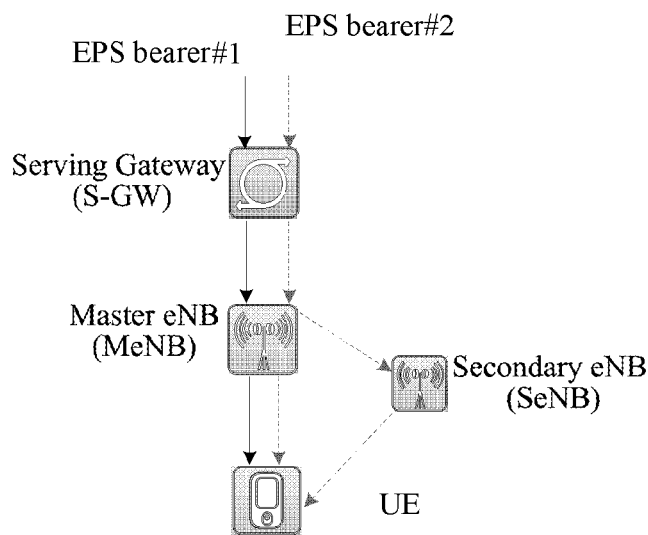
FIG. 2 is a schematic diagram of offloading transmission of a bearer level applicable to an embodiment of the present document.

FIG. 2 is a schematic diagram of offloading transmission of a bearer level applicable to an embodiment of the present document. As shown in FIG. 2, downstream data in the system architecture is provided as an example, transmission operation of an EPS bearer #1 is the same as that in the prior art where data packets are sent via an S1-U interface from a serving gateway (S-GW) to the MeNB and then are sent via a Uu interface from the MeNB to the UE; transmission of an EPS bearer #2 is that after data packets are sent via the S1-U interface from the S-GW to the MeNB, only part of the data packets are sent via the Uu interface from the MeNB to the UE, and the other part of the data packets are sent to the SeNB via data interfaces of the master eNB and the secondary eNB and then sent via the Uu interface from the SeNB to the UE. Therefore, data packets in the same bearer are sent via radio resource of two base stations, throughput of the offloading bearer (i.e. EPS bearer#2) has been enhanced greatly, the user's need for data rate has been satisfied.

Figure 3:
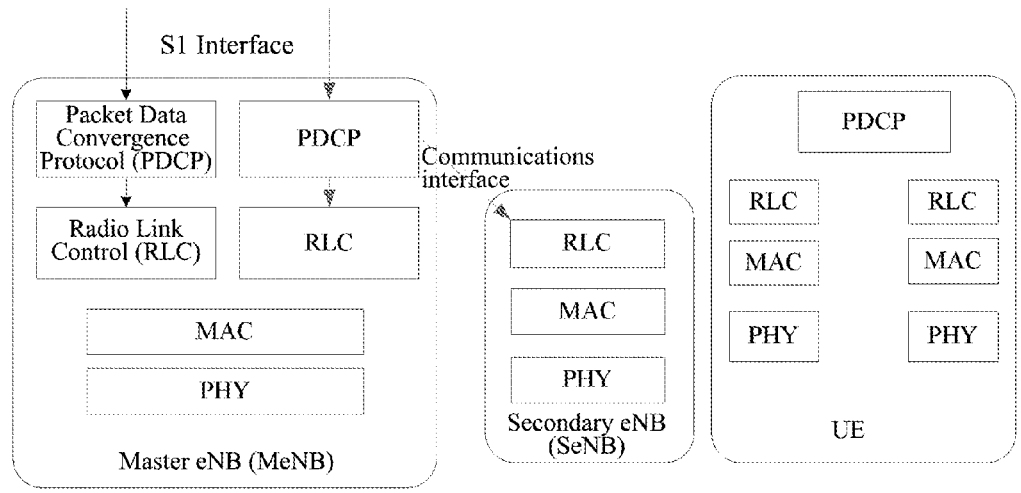
FIG. 3 is a schematic diagram of a user plane protocol stack applied by an embodiment of the present document.

FIG. 3 is a schematic diagram of a user plane protocol stack applied by an embodiment of the present document. As shown in FIG. 3, the offloading bearer has two independent radio link controls (RLC) and the following protocol layers. In other words, at a data transmitting side, according to a determined offloading policy, a packet data convergence protocol (PDCP) layer sends shunted packet data PDCP protocol data units (PDUs) to an RLC layer of an offloading node, the other data packets are sent via the their own RLC layer (and the following protocol layers); at a data receiving side, received data packets are processed and then transmitted to a uniform PDCP layer by two RLC layers.

In an original user plane architecture which is single-connectivity (i.e. Un-shunted), the PDCP of the receiving side only receives data packets transmitted by one RLC entity, and the data packets are transmitted sequentially by using identification of a sequence number (SN) of the PDCP. For a bearer in an RLC acknowledged mode (AM), its data packet delivering would be more continuous and complete. However, when RLCs corresponding to two transmission links are independent form each other, although RLCs still separately transmit sequential data packets to the PDCP, for the PDCP that receives uniformly data packets, data packets received from two RLCs are very likely to be non-sequential, this is because of different delays of data links where data packets are transported. Therefore, the PDCP of the receiving side is in a need for uniformly reordering of the data packets. Generally, in the LTE system, a method where a timer is configured may be adoptive for reordering, however, in particular for the reordering of the PDCP layer under the user plane architecture, how to properly configured the timer and perform management is a problem that urgently needs to be solved.

Figure 4:
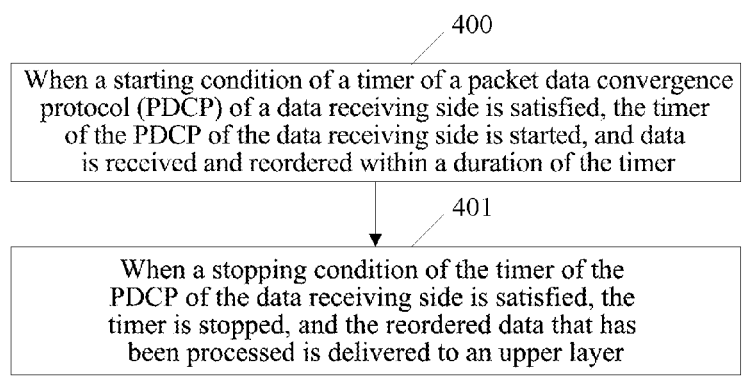
FIG. 4 is a flow chart of a method for realizing data transmission according to an embodiment of the present document.

FIG. 4 is a flow chart of a method for realizing data transmission according to an embodiment of the present document. As shown in FIG. 4, the method includes the following steps.

In step 400, when a starting condition of a timer of a packet data convergence protocol (PDCP) of a data receiving side is satisfied, the timer of the PDCP of the data receiving side is started, and data is received and reordered within a duration of the timer.

The duration of the timer is related to a radio link control (RLC) mode of an offloading bearer.

In this step, the starting condition of the timer is that: a serial number (SN) of a PDCP protocol data unit (PDU) transmitted by any one of RLCs and received by the PDCP of the data receiving side is not continuous with an SN of a last PDU transmitted to an upper layer; or two RLCs corresponding to the PDCP are changed to one RLC.

It should be noted that, continuousness of SNs of the PDUs herein refers to a continuous sequence similar to that of natural numbers, such as N, N+1, N+2 (N being a nonnegative integer); additionally, continuousness of SNs of the PDUs herein further includes the following situation: after reaching the maximum value, the SN is continuous in flipping, for example, if the length of the SN is L bits, the data packet with the SN (its initial value being 0) being the maximum value of the $L^{th}$ power of 2-1 is continuous with the next data packet with the SN=0.

Furthermore, the duration of the timer being related to the RLC mode of the offloading bearer includes:

when the offloading bearer is an offloading bearer mapped to an RLC acknowledged mode (AM), a duration value of the timer is a sum of an average delay of interfaces of a master eNB and a secondary eNB, a maximum allowed delay of an RLC automatic repeat request (ARQ), a maximum delay of a media access control layer (MAC) ARQ, a scheduling delay, and a delay related to interfaces of the master eNB and the secondary eNB; or when the offloading bearer is an offloading bearer mapped to an RLC unacknowledged mode (UM), a duration value of the timer is a sum of an average delay of interfaces of a master eNB and a secondary eNB, a maximum delay of a MAC ARQ, a scheduling delay and a delay related to interfaces of the master eNB and the secondary eNB.

It should be noted that, the delay related to the interfaces of the master eNB and the secondary eNB is a relay relative to the average delay of the interfaces of the master eNB and the secondary eNB, the average delay of the interfaces of the master eNB and the secondary eNB is an average value obtained through statistics, of data transmission, performed by a protocol during communication, while the delay related to the interfaces of the master eNB and the secondary eNB is duration data which is set according to system performance and requirement on data transmission and is related to the average delay of the interfaces of the master eNB and the secondary eNB. Generally, the setting is performed according to delay data acquired and recorded and requirement on system performance, and the specific setting depends upon the situation.

The data receiving side is a master eNB (MeNB) or a user equipment (UE).

When the data receiving side is the UE, a duration value of the timer is set by the MeNB indicating the UE via a control plane message;

the control plane message is a radio resource control (RRC) message, a PDCP layer control plane PDU, or a newly added control plane signaling.

By setting the starting condition of the timer, timekeeping is performed when data transmission of the PDCP requires timing. Data packets are received and reordered according to a duration setting of the timer. It has been implemented that, within a reasonable duration, the PDCP of the data receiving side waits for data packets received non-sequentially, and congestion in a data path/buffer area due to a long waiting time may not be caused, therefore, validity and reliability of data transmission are possessed.

In step 401, when a stopping condition of the timer of the PDCP of the data receiving side is satisfied, the timer is stopped, and the reordered data that has been processed is delivered to an upper layer.

In this step, the stopping condition of the timer is that: a duration value of the timer is reached, or within the duration of the timer, the PDCP of the data receiving side finishes PDCP PDUs that need to be reordered and of which SNs are before a PDU SN that triggers starting the timer.

It should be noted that, the PDCP PDUs that need to be reordered are data that needs to be delivered according to a protocol requirement. Data transmission in a protocol is delivered up from layer to layer, and the upper layer as used herein refers to a protocol layer of further data transmission. In addition, processing of the PDCP after reordering belongs to customary technical means for the person skilled in the art, and the description of transmission to the upper layer after processing is only for full understanding of the scheme.

In an embodiment of the present document, the method further includes: during a period that the timer is started and performs timekeeping, no new timer is started and performs timekeeping.

When the stopping condition of the timer is satisfied, the timer is stopped, and further transmission of data is performed. By managing the timer, it is implemented that reordered data packets are delivered timely and efficiently, and efficient performance of data transmission of the system is also guaranteed on the premise of guaranteeing that the data packets are reordered correctly.

When the offloading bearer is an offloading bearer mapped to the RLC AM, and after a link of the offloading bearer is released, the method of the present document further includes: the data receiving side sending a PDCP state report to a data transmitting side to request for data retransmission because of not receiving PDCP PDUs that need to be reordered, and the PDCP of the data receiving side restarting the timer to receive data.

Furthermore, when the restarted timer is stopped, the method of the present document further includes:

if the data receiving side receives the PDCP PDUs that need to be reordered, transmitting to an upper layer data that has been reordered; and if the data receiving side does not receive all the PDCP PDUs that need to be reordered, the PDCP of the data receiving side reordering and then delivering to an upper layer the received PDCP PDUs of which SNs are less than the SN that triggers starting the timer.

Figure 5:
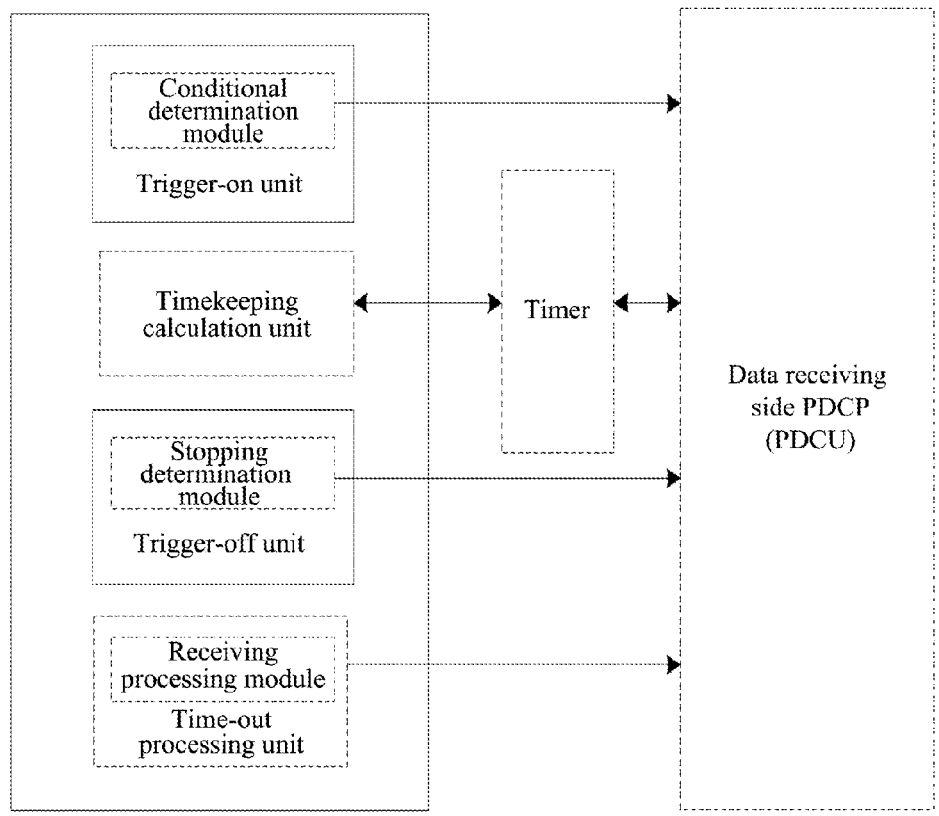
FIG. 5 is a block diagram of a structure of a device for realizing data transmission according to an embodiment of the present document.

FIG. 5 is a block diagram of a structure of a device for realizing data transmission according to an embodiment of the present document. As shown in FIG. 5, the device includes:

a trigger-on unit and a trigger-off unit; wherein:

the trigger-on unit is configured to, when a starting condition of a timer of a PDCP of a data receiving side is satisfied, start the timer, and receive and reorder data within a duration of the timer.

The trigger-on unit includes a condition determination module configured to: determine the starting condition of the timer, and start the timer when a serial number (SN) of a PDCP PDU transmitted by any one of RLCs and received by the PDCP of the data receiving side is not continuous with an SN of a last received PDU, or when two RLCs corresponding to the PDCP are changed to one RLC.

The duration of the timer is related to an RLC mode of an offloading bearer.

The trigger-off unit is configured to, when a stopping condition of the timer of the PDCP of the data receiving side is satisfied, stop the timer, and deliver to an upper layer the reordered data that has been processed.

The trigger-off unit includes a switch-off determination module configured to: determine the stopping condition of the timer, and stop the timer when a duration value of the timer is reached, or when within the duration of the timer, the PDCP of the data receiving side finishes PDCP PDUs that need to be reordered and of which SNs are before a PDU SN that triggers starting the timer.

The device of an embodiment of the present document further includes a timekeeping calculation unit configured to calculate the duration of the timer according to that the duration of the timer is related to the RLC mode of the offloading bearer, where:

when the offloading bearer is an offloading bearer mapped to an RLC acknowledged mode (AM), a duration value of the timer is a sum of an average delay of interfaces of a master eNB and a secondary eNB, a maximum allowed delay of an RLC ARQ, a maximum delay of a MAC ARQ, a scheduling delay, and a delay related to interfaces of the master eNB and the secondary eNB; or when the offloading bearer is an offloading bearer mapped to an RLC unacknowledged mode (UM), a duration value of the timer is a sum of an average delay of interfaces of a master eNB and a secondary eNB, a maximum delay of a MAC ARQ, a scheduling delay and a delay related to interfaces of the master eNB and the secondary eNB.

In an embodiment of the present document, during a period that the timer is started and performs timekeeping, no new timer is started and performs timekeeping.

Furthermore, the data receiving side is an MeNB or a UE.

When the data receiving side is the MeNB, a duration value of the timer is set by the MeNB itself; or when the data receiving side is the UE, a duration value of the timer is set by the MeNB indicating the UE via a control plane message.

The control plane message is a radio resource control (RRC) message, a PDCP layer control plane PDU, or a newly added control plane signaling.

The device of a embodiment of the present document further includes a time-out processing unit configured to: when the offloading bearer is an offloading bearer mapped to the RLC AM, and the data receiving side does not receive PDCP PDU packets that need to be reordered after a link of the offloading bearer is released, according to that the data receiving side sends a PDCP state report to a data transmitting side, request the timer to restart and deliver data.

Furthermore, the time-out processing unit further includes a receiving processing module configured to: when the timer is stopped, if the receiving side receives the PDCP PDUs that need to be reordered, transmit to an upper layer the PDCP PDUs that have been reordered; and if the receiving side does not receive all the PDCP PDUs that need to be reordered, reorder and then deliver to an upper layer the received PDCP PDUs of which SNs are less than the SN that triggers starting the timer.

The following further describes the method of the present document based on a receiving side of a transmission terminal with reference to a specific embodiment. The embodiment is only for clear description of the present document, and not for showing the protection scope of the present document.

Embodiment 1

Figure 6:
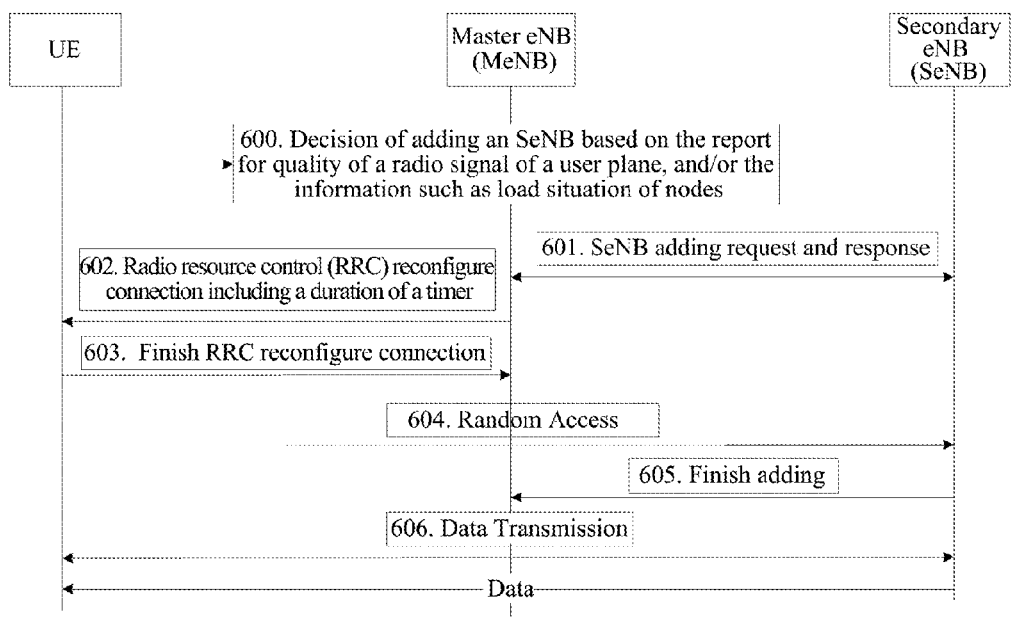
FIG. 6 is a flow chart of a first embodiment of realizing data transmission of the present document.

FIG. 6 is a flow chart of a first embodiment of realizing data transmission of the present document, as shown in FIG.

6, a UE is initially in a single-connectivity state and has a data transmission only with an MeNB. The corresponding operating specifications are the same as existing protocol standards. When the user terminal is performing data transmission, the master eNodeB receives a report for quality of a radio signal or information such as load situation of nodes, an SeNB is required to be added for performing offloading, the method includes the following steps.

In step 600, based on the report for quality of a radio signal of a user plane of UE, and/or the information such as load situation of nodes, the MeNB selects a decision of adding an SeNB, and selects one SeNB as an offloading node.

In step 601, the MeNB requests from the SeNB the request information of offloading resource, and obtains response information (messages carrying information such as offloading agreement and radio configuration of allowed offloading resource) replied by the SeNB.

In step 602, by using an RRC reconfigure connection message, the MeNB indicates new resource configuration to the UE, and the message carries a duration of a timer configured for a PDCP of an offloading bearer.

In this step, the duration of the timer is related to an RLC mode to which the offloading bearer is mapped, for an offloading bearer mapped to an RLC AM, a duration value of the timer is as follows:

when the offloading bearer is an offloading bearer mapped to the RLC AM, a duration value of the timer is a sum of an average delay of interfaces of the master eNB and the secondary eNB, a maximum allowed delay of an RLC ARQ, a maximum delay of a MAC ARQ, a scheduling delay, and a delay related to interfaces of the master eNB and the secondary eNB; or when the offloading bearer is an offloading bearer mapped to an RLC UM, a duration value of the timer is a sum of an average delay of interfaces of the master eNB and the secondary eNB, a maximum delay of a MAC ARQ, a scheduling delay and a delay related to interfaces of the master eNB and the secondary eNB.

In step 603, after the UE receives the RRC reconfigure connection message, the new resource configuration is performed, and after the configuration is finished, a message of finishing reconfigure connection is replied to the MeNB.

In step 604, the UE launches random access information to the SeNB to connect.

In step 605, after the access succeeds, the SeNB sends to the MeNB a message of finishing adding.

In step 606, the MeNB sends data to the SeNB, so that the SeNB, by using radio resource of itself, sends a data packet to the UE.

It should be noted that, in the figure, sending data from the MeNB to the UE may be implemented according to the prior art, the drawings is only for clear and full understanding of the sending of the data packet, and the data packet includes a PDCP PDU.

In a system architecture and a user plane mode, during a process that the UE is switched from a single-connectivity state to a dual-connectivity state, the MeNB should configure a timer with a reasonable duration for the PDCP of the receiving side, and the timer is set with a duration value related to the RLC mode to which the offloading bearer is mapped.

It should be noted that, although downstream data is used as an example in the embodiment, the same scheme is also used in the transmission of the corresponding upstream data. Only for the upstream data, the MeNB is used as the data receiving side, and the duration of the timer of the corresponding PDCP is calculated and determined directly by the MeNB.

Embodiment 2

In a system architecture and a user plane mode, a PDCP of a data receiving side receives data packets (PDCP PDU) from two corresponding RLCs. Based on existing standards, the PDCP PDU is numbered with SN. Correspondingly, a condition for triggering starting the timer includes that: the PDCP receives a new PDU whose SN is not continuous with an SN of the last PDU. A stopping condition of the timer includes: during the operating of the timer, PDCP receives PDUs that need to be reordered and of which the SNs are before a PDU SN that triggers starting the timer; if the PDUs that need to be reordered are not received within the duration of the timer, the timer is stopped after a timeout.

Figure 7:
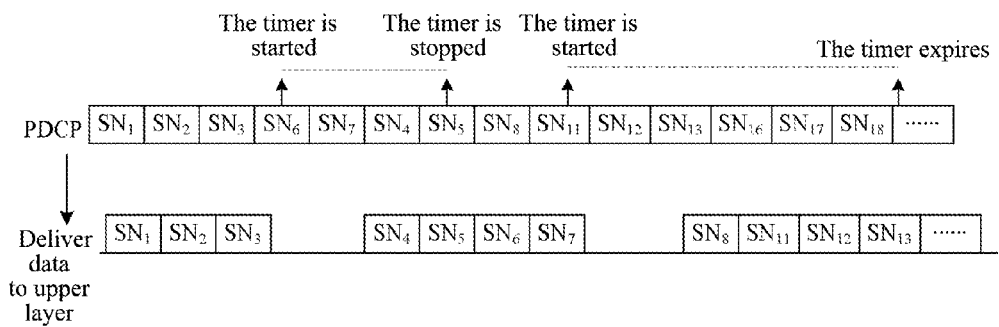
FIG. 7 is a flow chart of a second embodiment of realizing data transmission of the present document.

FIG. 7 is a flow chart of a second embodiment of realizing data transmission of the present document. As shown in FIG. 7, the PDCP PDUs, which are from the RLCs and received by the PDCP entity of the data receiving side, and numeral values of the PDCP PDUs are represented as SNx in the figure under the user plane architecture, the PDUs may come from one of two RLCs. Downstream data is still used as an example, assuming that an offloading policy is that every time an MeNB sends three data packets (such as SN1~SN3), an SeNB shunts and sends two data packets (such as SN4~SN5). The PDCP of the UE receives the SN1~SN3 transmitted by an RLC corresponding to the MeNB, these data packets are sequential and continuous, therefore, the PDCP processes these data packets and then transmits to an upper layer. The next PDU that the PDCP looks forward to receiving should be SN4. However, because of different path transmission delays and other reasons, the speed transmission may be faster for a link corresponding to the MeNB. Therefore, the PDCP actually receives PDU SN6, a starting condition of the timer occurs when a serial number (SN) of a PDCP PDU transmitted by any one of RLCs and received by the PDCP of the data receiving side is not continuous with an SN of a last received PDU, the configured timer is started and performs timekeeping.

During operation of the timer, the PDCP of the UE also receives PDU SN7, SN4, and SN5. In terms of the present embodiment, when PDU SN5 is received, data packets whose SNs are before PDU SN6 that triggers starting the timer are all received, the timer stops timekeeping. The data packets SN4~SN7 received during the operation of the timer may be reordered, the PDCP transmits to an upper layer the data packets that have been reordered and processed.

Subsequently, the PDCP receives PDU SN8 transmitted by the RLC. The next packet expected to be received should be PDU SN9, however, as shown in the figure, PDU SN11 is received by the PDCP, therefore, the timer is started and performs timekeeping again.

During operation of the timer, the PDCP receives subsequent packets such as PDU SN12, but PDU SN9 and PDU SN10 have not been received until the timer expires. After the timer expires, the PDCP determines that PDU SN9 and PDU SN10 are lost. After reordering and processing the data packets received during the operation of the timer, the PDCP transmits the data packets to the upper layer.

In addition, after the PDCP determines that there is data packet loss, a state report may be feed back to a data transmitting side to request for retransmitting the data packets that have not been received successfully, this does not affect the scheme of the present document.

It should be noted that, those successively arriving at the PDCP are used as an example of the data packets of the embodiment. Actually, because the PDCP corresponds to two independent RLCs, a case of simultaneously arriving at the PDCP may exist for the data packets transmitted by the RLCs. Generally, for any PDCP, during a period that the timer is started and performs timekeeping, no new timer should be started. After the timer is stopped, the PDCP performs processing of functions such as reordering on the data packets received during the operation of the timer. In addition, transmission of downstream data is used as an example in the embodiment, if the offloading bearer is upstream data, then starting/stopping conditions of the corresponding timers are the same, and the operation is just within the MeNB.

Embodiment 3

For an offloading bearer mapped to the RLC AM, when resources of the SeNB are released, PDCP data packets that have not been received successfully by the receiving side should be retransmitted by the transmitting side. For allowing a reasonable period of time for retransmitting data packets and avoiding system performance degradation caused by a long wait time, the operating timer may be restarted once.

Figure 8:
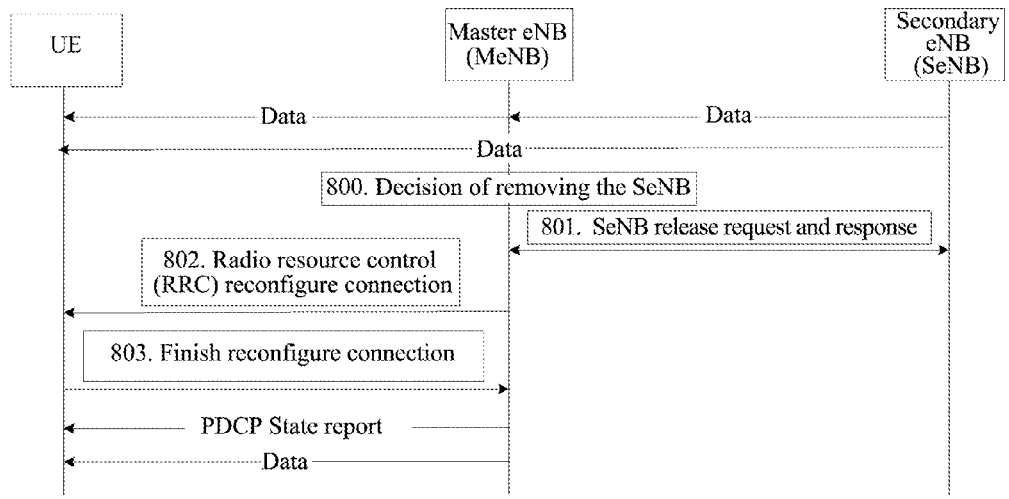
FIG. 8 is a flow chart of a third embodiment of realizing data transmission of the present document.

FIG. 8 is a flow chart of a third embodiment of realizing data transmission of the present document, as shown in FIG. 8, the MeNB configures the UE to be in a DC state. According to information such as radio environment and/or load situation of nodes, when MeNB decides to remove offloading resources bared by the SeNB;

In step 800, the MeNB sends decision information of removing the SeNB, that is, the SeNB is notified to be released;

In step 801, the SeNB receives a release request and replies a response message.

In step 802, the MeNB indicates new resource configuration to the UE by using an RRC message.

In step 803, the UE leaves a cell of the SeNB according to a received control plane message, that is, the UE is returned to be in a state of only connecting with the MeNB.

If the offloading bearer is mapped to the RLC AM, for the PDCP PDU that has not been delivered successfully by an offloading link, the data receiving side may indicate the data transmitting side by using a PDCP state report after the offloading link is released. According to the state report, the data transmitting side may retransmit the PDU that has not been received successfully by the receiving side.

If the data packets that need to be reordered are received during the operation of the timer after restarting, the timer is stopped, the PDCP of the receiving side reorders the received data packets and then processes and transmits to an upper layer.

If not all the data packets that need to be reordered are received during the operation of the timer after restarting, after the timer expires, the PDCP of the receiving side reorders the received data packets and then processes and transmits to an upper layer.

In this way, after the change of the transmission link of the offloading bearer occurs, the receiving side allows some time for data packets which need to be retransmitted, while avoiding congestion of the data link caused by a long wait time and affecting the performance.

Those ordinarily skilled in the art can understand that all or some of steps of the above method may be completed by the programs instructing the relevant hardware, and the programs may be stored in a computer-readable storage medium, such as read only memory, magnetic or optical disk. Alternatively, all or some of the steps of the above embodiments may also be implemented by using one or more integrated circuits. Accordingly, each module/unit in the above embodiments may be realized in a form of hardware, or in a form of software function module. The present document is not limited to any specific form of hardware and software combinations.

The embodiments disclosed in the present document are described above, but they are only the preferred embodiments of the present document for understanding the present document easily, and they are not used for limiting the protection scope of the present document. Those skilled in the art can make any modification and change in the implementations and details without departing from the essence and scope of the present document, but the protection scope of the present document is subject to the scope defined by the appended claims.

INDUSTRIAL APPLICABILITY

In embodiments of the present document, by setting the starting condition of the timer of the PDCP, data packets are delivered and reordered within the duration of the timer when the data packets are delivered, and the timer is stopped while the data packets are continuously delivered when the stopping condition of the timer is satisfied, which realizes efficient ordered transmission of the data packets of the PDCP.

What we claim is:

1. A method for realizing data transmission, comprising:
when a starting condition of a timer of a packet data convergence protocol (PDCP) of a data receiving side is satisfied, starting the timer of the PDCP of the data receiving side, and receiving and reordering data within a duration of the timer; and
when a stopping condition of the timer of the PDCP of the data receiving side is satisfied, stopping the timer, and delivering to an upper layer the reordered data that has been processed; wherein
the duration of the timer is related to a radio link control (RLC) mode of an offloading bearer;
wherein the duration of the timer being related to the RLC mode of the offloading bearer comprises:
when the offloading bearer is an offloading bearer mapped to an RLC acknowledged mode (AM), a duration value of the timer being a sum of an average delay of interfaces of a master eNB and a secondary eNB, a maximum allowed delay of an RLC automatic repeat request (ARQ), a maximum delay of a media access control layer (MAC) ARQ, a scheduling delay, and a delay related to interfaces of the master eNB and the secondary eNB; or
when the offloading bearer is an offloading bearer mapped to an RLC unacknowledged mode (UM), a duration value of the timer being a sum of an average delay of interfaces of a master eNB and a secondary eNB, a maximum delay of a MAC ARQ, a scheduling delay and a delay related to interfaces of the master eNB and the secondary eNB.

2. The method according to claim 1, wherein the starting condition of the timer is that:
a serial number (SN) of a PDCP protocol data unit (PDU) transmitted by any one of RLCs and received by the PDCP of the data receiving side is not continuous with an SN of a last PDU transmitted to an upper layer; or two RLCs corresponding to the PDCP are changed to one RLC.

3. The method according to claim 1, wherein the stopping condition of the timer is that:
a duration value of the timer is reached; or
within the duration of the timer, the PDCP of the data receiving side finishes receiving PDCP PDUs that need to be reordered and of which SNs are before a PDU SN that triggers starting the timer.

4. The method according to claim 2, wherein the method further comprises that: during a period that the timer is started and performs timekeeping, no new timer is started and performs timekeeping.

5. The method according to claim 1, wherein the data receiving side is a master eNB (MeNB) or a user equipment (UE).

6. The method according to claim 5, wherein when the data receiving side is the MeNB, a duration value of the timer is set by the MeNB itself; or
when the data receiving side is the UE, a duration value of the timer is set by the MeNB indicating the UE via a control plane message; wherein
the control plane message is a radio resource control (RRC) message, a PDCP layer control plane PDU, or a newly added control plane signaling.

7. The method according to claim 1, wherein when the offloading bearer is an offloading bearer mapped to the RLC AM, and after a link of the offloading bearer is released, the method further comprises:
the data receiving side sending a PDCP state report to a data transmitting side to request for data retransmission because of not receiving PDCP PDUs that need to be reordered, and the PDCP of the data receiving side restarting the timer to receive data.

8. The method according to claim 7, wherein when the restarted timer is stopped, the method further comprises:
if the data receiving side receives the PDCP PDUs that need to be reordered, transmitting to an upper layer data packets that have been reordered and processed; and
if the data receiving side does not receive all the PDCP PDUs that need to be reordered, the PDCP of the data receiving side reordering and then delivering to an upper layer the received PDCP PDUs of which SNs are less than the SN that triggers starting the timer.

9. A device for realizing data transmission, comprising: a trigger-on unit and a trigger-off unit; wherein:
the trigger-on unit is configured to, when a starting condition of a timer of a packet data convergence protocol (PDCP) of a data receiving side is satisfied, start the timer, and receive and reorder data within a duration of the timer;
the duration of the timer is related to a radio link control (RLC) mode of an offloading bearer;
the trigger-off unit is configured to, when a stopping condition of the timer of the PDCP of the data receiving side is satisfied, stop the timer, and deliver to an upper layer the reordered data that has been processed;
wherein the device further comprises a timekeeping calculation unit configured to calculate the duration of the timer according to that the duration of the timer is related to the radio link control (RLC) mode of the offloading bearer, wherein:
when the offloading bearer is an offloading bearer mapped to an RLC acknowledged mode (AM), a duration value of the timer is a sum of an average delay of interfaces of a master eNB and a secondary eNB, a maximum allowed delay of an RLC automatic repeat request (ARQ), a maximum delay of a media access control layer (MAC) ARQ, a scheduling delay, and a delay related to interfaces of the master eNB and the secondary eNB; or
when the offloading bearer is an offloading bearer mapped to an RLC unacknowledged mode (UM), a duration value of the timer is a sum of an average delay of interfaces of a master eNB and a secondary eNB, a maximum delay of a MAC ARQ, a scheduling delay and a delay related to interfaces of the master eNB and the secondary eNB.

10. The device according to claim 9, wherein the trigger-on unit comprises a condition determination module configured to: determine the starting condition of the timer, and start the timer when a serial number (SN) of a PDCP protocol data unit (PDU) transmitted by any one of RLCs and received by the PDCP of the data receiving side is not continuous with an SN of a last PDU transmitted to an upper layer, or when two RLCs corresponding to the PDCP are changed to one RLC.

11. The device according to claim 9, wherein the trigger-off unit comprises a stopping determination module configured to: determine the stopping condition of the timer, and stop the timer when a duration value of the timer is reached, or when within the duration of the timer, the PDCP of the data receiving side finishes PDCP PDUs that need to be reordered and of which SNs are before a PDU SN that triggers starting the timer.

12. The device according to claim 10, wherein during a period that the timer is started and performs timekeeping, no new timer is started and performs timekeeping.

13. The device according to claim 9, wherein the data receiving side is a master eNB (MeNB) or a user equipment (UE).

14. The device according to claim 13, wherein when the data receiving side is the MeNB, a duration value of the timer is set by the MeNB itself; or when the data receiving side is the UE, a duration value of the timer is set by the MeNB indicating the UE via a control plane message; wherein
the control plane message is a radio resource control (RRC) message, a PDCP layer control plane PDU, or a newly added control plane signaling.

15. The device according to claim 9, wherein the device further comprises a time-out processing unit configured to: when the offloading bearer is an offloading bearer mapped to the RLC AM, and the data receiving side does not receive PDCP PDU packets that need to be reordered after a link of the offloading bearer is released, according to that the data receiving side sends a PDCP state report to a data transmitting side, request the timer to restart and deliver data.

16. The device according to claim 15, wherein the time-out processing unit further comprises a receiving processing module configured to: when the timer is stopped,
if the receiving side receives the PDCP PDUs that need to be reordered, transmit to an upper layer the PDCP PDUs that have been reordered and processed; and
if the receiving side does not receive all the PDCP PDUs that need to be reordered, reorder and then deliver to an upper layer the received PDCP PDUs of which SNs are less than the SN that triggers starting the timer.

* * * * *